US012629916B2

(12) United States Patent
Pujar et al.

(10) Patent No.: US 12,629,916 B2
(45) Date of Patent: May 19, 2026

(54) COMMINGLED FIBER PREFORM ARCHITECTURE FOR HIGH TEMPERATURE COMPOSITES

(71) Applicant: ROHR, INC., Chula Vista, CA (US)

(72) Inventors: Vijay V. Pujar, San Diego, CA (US); Bryan Thai, Poway, CA (US); Katherine E. Waugh, San Diego, CA (US); Christopher C. Koroly, Spring Valley, CA (US)

(73) Assignee: ROHR, INC., Chula Vista, CA (US)

( * ) Notice: Subject to any disclaimer, the term of this patent is extended or adjusted under 35 U.S.C. 154(b) by 348 days.

(21) Appl. No.: 18/321,726

(22) Filed: May 22, 2023

(65) Prior Publication Data

US 2024/0391208 A1 Nov. 28, 2024

(51) Int. Cl.
*B32B 5/12* (2006.01)
*B32B 5/02* (2006.01)
(Continued)

(52) U.S. Cl.
CPC ................ *B32B 5/12* (2013.01); *B32B 5/022* (2013.01); *B32B 5/024* (2013.01); *B32B 5/26* (2013.01);
(Continued)

(58) Field of Classification Search
CPC ........... B32B 5/12; B32B 5/022; B32B 5/024; B32B 5/26; B32B 37/16; B32B 38/0036; B32B 2250/20; B32B 2250/44; B32B 2262/106; B32B 2305/18; B32B 2605/18; B32B 5/08; B32B 5/14; B32B 5/145;

B32B 2262/02; B32B 2262/14; B32B 7/09; B29B 11/16; C04B 2235/5212; C04B 2235/5268; C04B 2235/614; C04B 35/83;
(Continued)

(56) References Cited

U.S. PATENT DOCUMENTS 8,752,255 B2 6/2014 Lecostaouec
10,995,039 B1 5/2021 Dunn et al.
(Continued)

FOREIGN PATENT DOCUMENTS

CN 110093713 8/2019
WO 2011099611 8/2011

OTHER PUBLICATIONS

European Patent Office, European Search Report dated Sep. 2, 2024 in Application No. 24177165.8.

*Primary Examiner* — Elizabeth M Imani
(74) *Attorney, Agent, or Firm* — SNELL & WILMER L.L.P.

(57) ABSTRACT

A preform is provided. The preform includes first fabric layers that include a first set of commingled fibers and a second set of commingled fibers. The preform includes a second fabric layer positioned between the first fabric layers. The second fabric layer includes a third set of commingled fibers and a fourth set of commingled fibers. The first set of commingled fibers includes a lower percentage of the at least one of first carbon fibers or first fusible fibers than the third set of commingled fibers, The first set of commingled fibers include a higher percentage of first fugitive fibers than the third set of commingled fibers. The first fugitive fibers and the third fugitive fibers are pyrolyzed from the first fabric layers and the second fabric layer.

20 Claims, 13 Drawing Sheets

(51) Int. Cl.
  *B32B 5/26*          (2006.01)
  *B32B 37/16*         (2006.01)
  *B32B 38/00*         (2006.01)

(52) U.S. Cl.
  CPC .......... *B32B 37/16* (2013.01); *B32B 38/0036*
       (2013.01); *B32B 2250/20* (2013.01); *B32B*
    *2250/44* (2013.01); *B32B 2262/106* (2013.01);
       *B32B 2305/18* (2013.01); *B32B 2605/18*
                                          (2013.01)

(58) Field of Classification Search
  CPC .... D02G 3/402; D03D 15/275; D03D 15/587;
       D04H 3/002; D04H 3/04; D04H 3/105;
             D04H 3/115; D10B 2101/12; D10B
             2401/041; D10B 2403/02412; D10B
                         2505/02; D04B 21/165
  See application file for complete search history.

(56)                   References Cited

U.S. PATENT DOCUMENTS

| | | | |
|---|---|---|---|
| 11,434,176 | B2 | 9/2022 | Harris |
| 2003/0100239 | A1* | 5/2003 | Gaffney .................... D01F 9/22 |
| | | | 442/212 |
| 2017/0151712 | A1* | 6/2017 | La Forest ............. B29C 64/118 |
| 2018/0126674 | A1 | 5/2018 | Ohtani et al. |
| 2019/0177240 | A1* | 6/2019 | Harris ..................... D02J 13/00 |

* cited by examiner

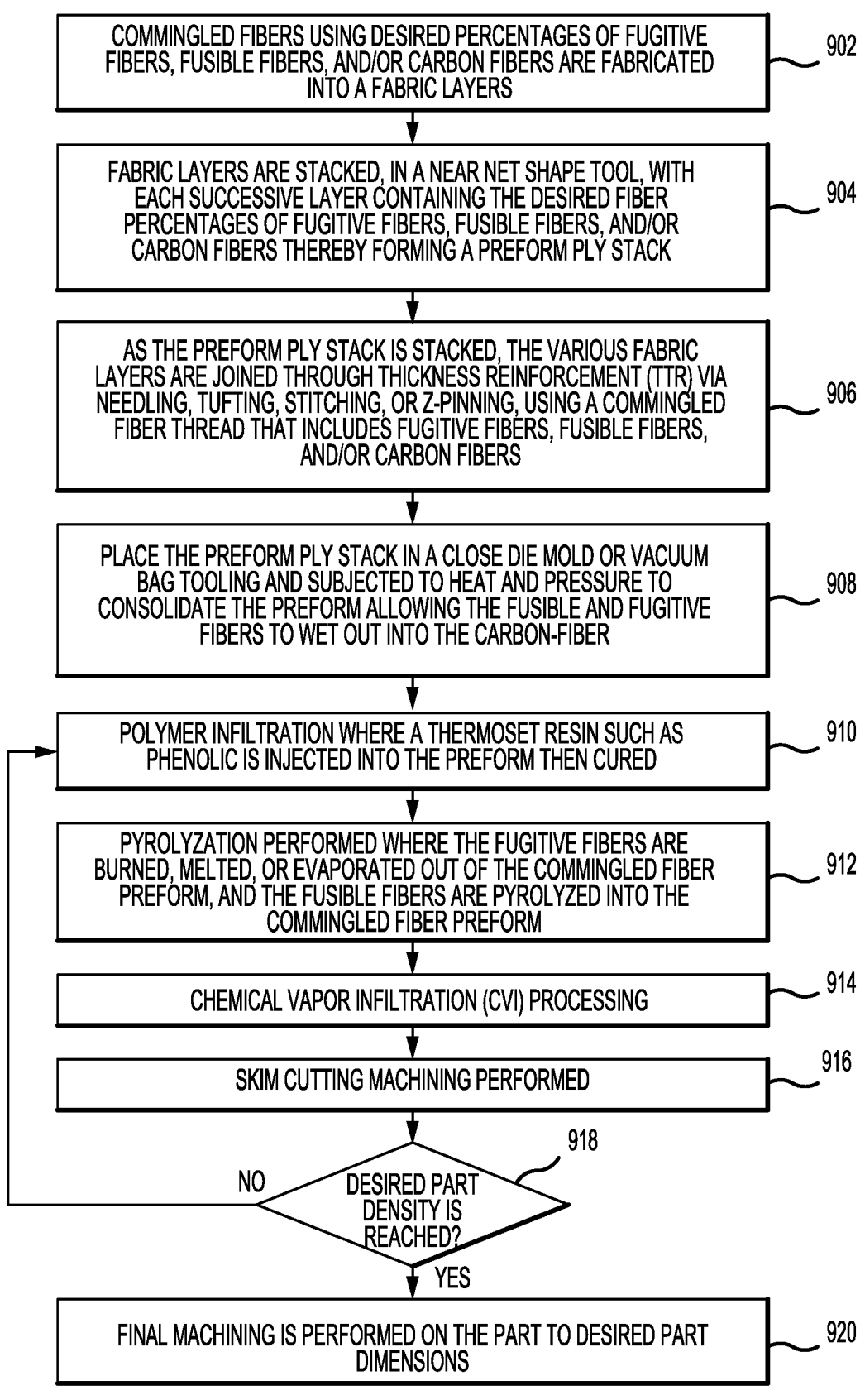

COMMINGLED FIBERS USING DESIRED PERCENTAGES OF FUGITIVE FIBERS, FUSIBLE FIBERS, AND/OR CARBON FIBERS ARE FABRICATED INTO A FABRIC LAYERS — 902

FABRIC LAYERS ARE STACKED, IN A NEAR NET SHAPE TOOL, WITH EACH SUCCESSIVE LAYER CONTAINING THE DESIRED FIBER PERCENTAGES OF FUGITIVE FIBERS, FUSIBLE FIBERS, AND/OR CARBON FIBERS THEREBY FORMING A PREFORM PLY STACK — 904

AS THE PREFORM PLY STACK IS STACKED, THE VARIOUS FABRIC LAYERS ARE JOINED THROUGH THICKNESS REINFORCEMENT (TTR) VIA NEEDLING, TUFTING, STITCHING, OR Z-PINNING, USING A COMMINGLED FIBER THREAD THAT INCLUDES FUGITIVE FIBERS, FUSIBLE FIBERS, AND/OR CARBON FIBERS — 906

PLACE THE PREFORM PLY STACK IN A CLOSE DIE MOLD OR VACUUM BAG TOOLING AND SUBJECTED TO HEAT AND PRESSURE TO CONSOLIDATE THE PREFORM ALLOWING THE FUSIBLE AND FUGITIVE FIBERS TO WET OUT INTO THE CARBON-FIBER — 908

POLYMER INFILTRATION WHERE A THERMOSET RESIN SUCH AS PHENOLIC IS INJECTED INTO THE PREFORM THEN CURED — 910

PYROLYZATION PERFORMED WHERE THE FUGITIVE FIBERS ARE BURNED, MELTED, OR EVAPORATED OUT OF THE COMMINGLED FIBER PREFORM, AND THE FUSIBLE FIBERS ARE PYROLYZED INTO THE COMMINGLED FIBER PREFORM — 912

CHEMICAL VAPOR INFILTRATION (CVI) PROCESSING — 914

SKIM CUTTING MACHINING PERFORMED — 916

NO ◇ DESIRED PART DENSITY IS REACHED? — 918

YES

FINAL MACHINING IS PERFORMED ON THE PART TO DESIRED PART DIMENSIONS — 920

FIG.9

COMMINGLED FIBER PREFORM ARCHITECTURE FOR HIGH TEMPERATURE COMPOSITES

FIELD

The present disclosure relates generally to composite preform components and, more particularly, to a commingled fiber preform architecture for high temperature composites.

BACKGROUND

Shaped composite bodies are utilized in aerospace applications. Various systems and methods are known in the art for forming a preform into a shaped composite body. In typical carbon-carbon manufacturing, a dry fabric may be used to make a preform. The dry preform is then densified using gas infiltration. There are many variables that determine the success of the densification stage, including the number of available pathways for the gas to infiltrate uniformly into the center of the preform.

SUMMARY

According to various embodiments of the present disclosure, a preform is provided. The preform includes first fabric layers. The first fabric layers include a first set of commingled fibers and a second set of commingled fibers. The first set of commingled fibers includes at least one of first carbon fibers or first fusible fibers commingled with first fugitive fibers. The second set of commingled fibers includes second carbon fibers. The first set of commingled fibers is arranged in a first direction with the second set of commingled fibers is arranged in a second direction. The preform includes a second fabric layer positioned between the first fabric layers. The second fabric layer includes a third set of commingled fibers and a fourth set of commingled fibers. The third set of commingled fibers includes at least one of third carbon fibers or third fusible fibers commingled with third fugitive fibers. The fourth set of commingled fibers includes fourth carbon fibers. The third set of commingled fibers is arranged in the first direction with the fourth set of commingled fibers is arranged in the second direction. The first set of commingled fibers include a higher percentage of first fugitive fibers than the third set of commingled fibers. The first fugitive fibers and the third fugitive fibers are pyrolyzed from the first fabric layers and the second fabric layer to create a path through a thickness of the first fabric layers and the second fabric layer for infiltration of fluids.

In various embodiments, the first set of commingled fibers include a lower percentage of the at least one of first carbon fibers or first fusible fibers than the third set of commingled fibers. In various embodiments, a percentage of at least one of the first carbon fibers or the first fusible fibers exceeds a percentage of the first fugitive fibers in the first set of commingled fibers. In various embodiments, a percentage of at least one of the third carbon fibers or the third fusible fibers exceeds a percentage of the third fugitive fibers in the third set of commingled fibers. In various embodiments, the second set of commingled fibers further comprise second fusible fibers. In various embodiments, the fourth set of commingled fibers further comprise fourth fusible fibers. In various embodiments, the second set of commingled fibers further comprise second fugitive fibers and the second fugitive fibers are pyrolyzed from the fabric layer. in various embodiments, the fourth set of commingled fibers further comprise fourth fugitive fibers and the fourth fugitive fibers are pyrolyzed from the second fabric layer. In various embodiments, a percentage of the second carbon fibers in the second set of commingled fibers exceeds a percentage of the second fugitive fibers in the second set of commingled fibers. In various embodiments, a percentage of the fourth carbon fibers in the fourth set of commingled fibers exceeds a percentage of the fourth fugitive fibers in the fourth set of commingled fibers.

In various embodiments, the second set of commingled fibers further comprise second fusible fibers and second fugitive fibers and the second fugitive fibers are pyrolyzed from the fabric layer. In various embodiments, the fourth set of commingled fibers further comprise fourth fusible fibers and fourth fugitive fibers and the fourth fugitive fibers are pyrolyzed from the second fabric layer. In various embodiments, a percentage of the second carbon fibers in the second set of commingled fibers exceeds a percentage of the second fugitive fibers in the second set of commingled fibers. In various embodiments, a percentage of the fourth carbon fibers in the fourth set of commingled fibers exceeds a percentage of the fourth fugitive fibers in the fourth set of commingled fibers.

In various embodiments, responsive to the first carbon fibers being commingled with the first fugitive fibers, a percentage of the first carbon fibers in the first set of commingled fibers exceeds a percentage of the first fugitive fibers in the first set of commingled fibers. In various embodiments, responsive to the third carbon fibers being commingled with the third fugitive fibers, a percentage of the third carbon fibers in the third set of commingled fibers exceeds a percentage of the third fugitive fibers in the third set of commingled fibers. In various embodiments, responsive to the first fusible fibers being commingled with the first fugitive fibers, a percentage of the first fusible fibers in the first set of commingled fibers exceeds a percentage of the first fugitive fibers in the first set of commingled fibers. In various embodiments, responsive to the third fusible fibers being commingled with the third fugitive fibers, a percentage of the third fusible fibers in the third set of commingled fibers exceeds a percentage of the third fugitive fibers in the third set of commingled fibers. In various embodiments, responsive to the first carbon fibers and the first fusible fibers being commingled with the first fugitive fibers, a percentage of the first carbon fibers in the first set of commingled fibers exceeds a percentage of the first fugitive fibers in the first set of commingled fibers. In various embodiments, responsive to the third carbon fibers and the third fusible fibers being commingled with the third fugitive fibers, a percentage of the third carbon fibers in the third set of commingled fibers exceeds a percentage of the third fugitive fibers in the third set of commingled fibers.

According to various embodiments of the present disclosure, a manufacturing method is provided. The method includes forming first fabric layers for a commingled fiber preform by weaving a first set of commingled fibers in a first direction with a second set of commingled fibers in a second direction. The first set of commingled fibers comprises at least one of first carbon fibers or first fusible fibers commingled with first fugitive fibers. The second set of commingled fibers comprises second carbon fibers. The method includes forming a second fabric layer for the commingled fiber preform by weaving a third set of commingled fibers in the first direction with a fourth set of commingled fibers in the second direction. The third set of commingled fibers includes at least one of third carbon fibers or third fusible fibers commingled with third fugitive fibers. The fourth set of commingled fibers includes fourth carbon fibers, The method includes positioning the second fabric layer between the first fabric layers. The first set of commingled fibers include a higher percentage of first fugitive fibers than the third set of commingled fibers. The first fugitive fibers and the third fugitive fibers are pyrolyzed from the first fabric layers and the second fabric layer to create a path through a thickness of the first fabric layers and the second fabric layer for infiltration of fluids.

In various embodiments, the first set of commingled fibers include a lower percentage of the at least one of first carbon fibers or first fusible fibers than the third set of commingled fibers. In various embodiments, a percentage of at least one of the first carbon fibers or the first fusible fibers exceeds a percentage of the first fugitive fibers in the first set of commingled fibers. In various embodiments, a percentage of at least one of the third carbon fibers or the third fusible fibers exceeds a percentage of the third fugitive fibers in the third set of commingled fibers. In various embodiments, the second set of commingled fibers further comprise second fusible fibers. In various embodiments, the fourth set of commingled fibers further comprise fourth fusible fibers. In various embodiments, the second set of commingled fibers further comprise second fugitive fibers and the second fugitive fibers are pyrolyzed from the fabric layer. in various embodiments, the fourth set of commingled fibers further comprise fourth fugitive fibers and the fourth fugitive fibers are pyrolyzed from the second fabric layer. In various embodiments, a percentage of the second carbon fibers in the second set of commingled fibers exceeds a percentage of the second fugitive fibers in the second set of commingled fibers. In various embodiments, a percentage of the fourth carbon fibers in the fourth set of commingled fibers exceeds a percentage of the fourth fugitive fibers in the fourth set of commingled fibers.

In various embodiments, the second set of commingled fibers further comprise second fusible fibers and second fugitive fibers and the second fugitive fibers are pyrolyzed from the fabric layer. In various embodiments, the fourth set of commingled fibers further comprise fourth fusible fibers and fourth fugitive fibers and the fourth fugitive fibers are pyrolyzed from the second fabric layer. In various embodiments, a percentage of the second carbon fibers in the second set of commingled fibers exceeds a percentage of the second fugitive fibers in the second set of commingled fibers. In various embodiments, a percentage of the fourth carbon fibers in the fourth set of commingled fibers exceeds a percentage of the fourth fugitive fibers in the fourth set of commingled fibers.

In various embodiments, responsive to the first carbon fibers being commingled with the first fugitive fibers, a percentage of the first carbon fibers in the first set of commingled fibers exceeds a percentage of the first fugitive fibers in the first set of commingled fibers. In various embodiments, responsive to the third carbon fibers being commingled with the third fugitive fibers, a percentage of the third carbon fibers in the third set of commingled fibers exceeds a percentage of the third fugitive fibers in the third set of commingled fibers. In various embodiments, responsive to the first fusible fibers being commingled with the first fugitive fibers, a percentage of the first fusible fibers in the first set of commingled fibers exceeds a percentage of the first fugitive fibers in the first set of commingled fibers. In various embodiments, responsive to the third fusible fibers being commingled with the third fugitive fibers, a percentage of the third fusible fibers in the third set of commingled fibers exceeds a percentage of the third fugitive fibers in the third set of commingled fibers. In various embodiments, responsive to the first carbon fibers and the first fusible fibers being commingled with the first fugitive fibers, a percentage of the first carbon fibers in the first set of commingled fibers exceeds a percentage of the first fugitive fibers in the first set of commingled fibers. In various embodiments, responsive to the third carbon fibers and the third fusible fibers being commingled with the third fugitive fibers, a percentage of the third carbon fibers in the third set of commingled fibers exceeds a percentage of the third fugitive fibers in the third set of commingled fibers.

According to various embodiments of the present disclosure, a compositionally gradient preform is provided. The compositionally gradient preform includes a gradient comprising fusible fibers and fugitive fibers. The compositionally gradient preform has a plurality of fabric layers. A percentage of the fusible fibers sequentially decreases from one fabric layer in the plurality of fabric layers to a next fabric layer in the plurality of fabric layers in a direction starting from a center fabric layer in the plurality of fabric layers to surface layers in the plurality of fabric layers. A percentage of the fugitive fibers sequentially increases from the one fabric layer in the plurality of fabric layers to the next fabric layer in the plurality of fabric layers in a direction starting from the central fabric layer in the plurality of fabric layers to the surface layers in the plurality of fabric layers.

The present disclosure may include any one or more of the individual features disclosed above and/or below alone or in any combination thereof.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 9 illustrates a method of forming a commingled fiber preform for a high temperature composite, in accordance with various embodiments.

DETAILED DESCRIPTION

Figure 1:
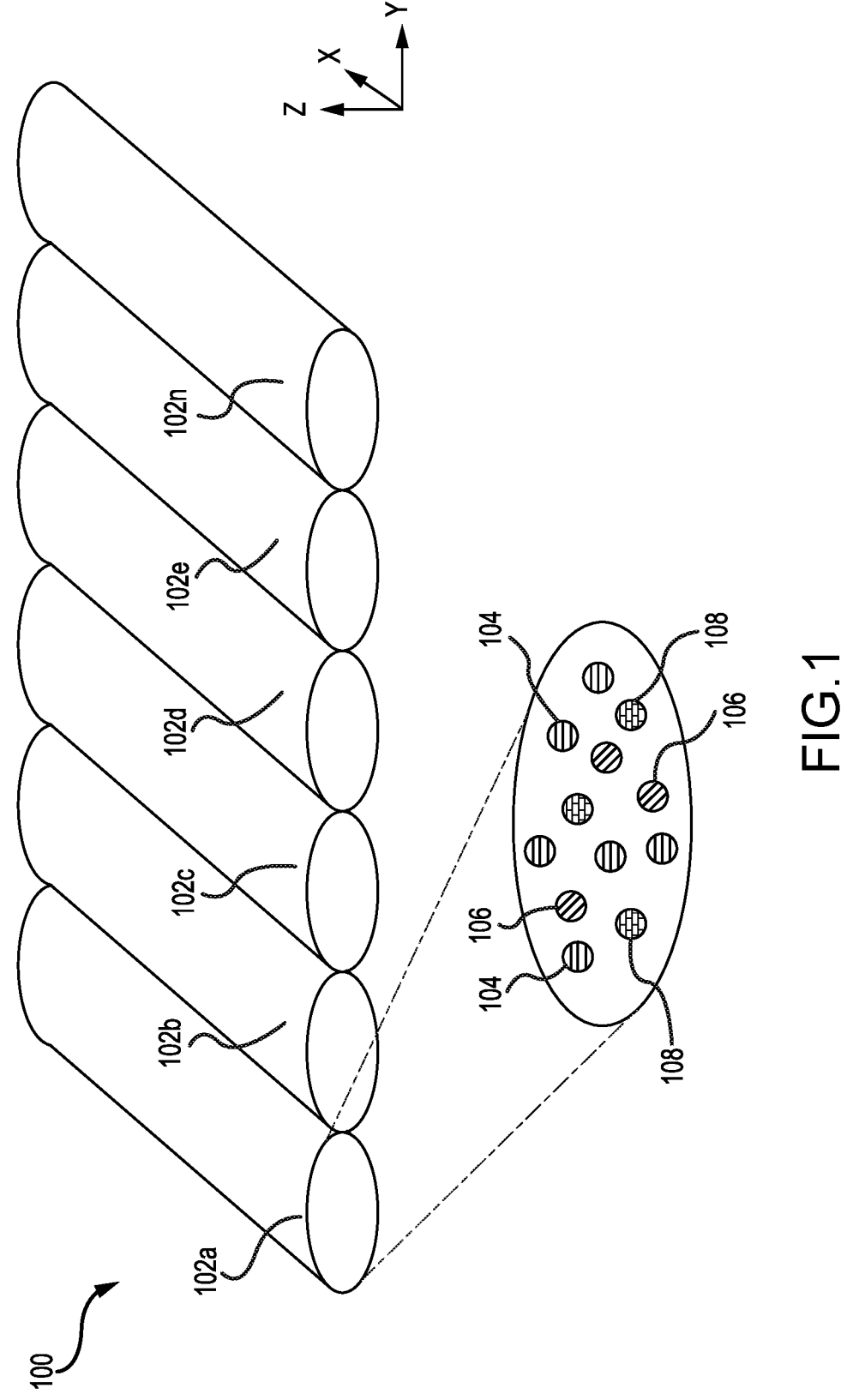
FIG. 1 illustrates a fabric layer formed using commingled fibers including percentages of fugitive fibers, fusible fibers, and/or carbon fibers, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Various systems and methods are known in the art for generating a commingled fiber preform. Commingled fibers and yarn typically entangle thermoplastic or thermoset fibers with carbon, glass, or other reinforcement fibers to produce a low-cost, yet highly-flexible material utilized to manufacture components with complex geometries. In typical carbon-carbon manufacturing, a commingled fiber preform may be manufactured and this commingled fiber preform may then be densified using gas infiltration. There are many variables that determine the success of the densification stage, including the number of available pathways for the gas to infiltrate uniformly into the center of the commingled fiber preform. Typically, fiber volume and lack of adequate gas flow paths inhibit uniform densification and yield a component with less than 10 percent open porosity.

Disclosed herein are systems and methods for a commingled fiber preform architecture for high temperature composites that provides numerous pathways for fluids, i.e. uniform gas, infiltration into the center of the commingled fiber preform during densification. In various embodiments, commingled fibers using desired percentages of fugitive fibers, fusible fibers, and/or carbon fibers are fabricated into a fabric layers of either woven fabric layers, a non-crimp fabric layers, such as unidirectional or stitched unidirectional, or a felt fabric layers.

As used herein, a fusible fiber is comprised of one or more polymers with a combined char yield of 25% or greater by weight and a residual mass of less than 1% by weight. As used herein, a fugitive fiber is comprised of one or more polymers with a combined char yield of 5% or less by weight, and a residual mass of less than 1% by weight. As used herein, char yield is defined as the percentage of weight remaining when the fiber material is heated (or pyrolyzed) in an inert atmosphere (e.g., nitrogen or argon) at temperatures of up to about 1000 degrees Celsius (about 1832 degrees Fahrenheit). As used herein, residual mass is defined as percentage of weight remaining when the fiber material is heated (or oxidized) in an oxidizing atmosphere (e.g., air, or oxygen) at temperatures of up to about 1000 degrees Celsius (about 1832 degrees Fahrenheit). It should be noted that while a residual mass of 1% or less is preferred in the production of carbon-carbon composite structures for high temperature applications, a residual mass of greater than 1% may be acceptable for certain lower temperature applications.

In various embodiments, carbon fibers may include a variety of carbon moduli but, for flexibility during preform lay-up, standard or intermediate modulus carbon fibers may be preferred. In various embodiments, carbon fibers are comprised of 85% of carbon by weight or greater. In various embodiments, fugitive fibers may include fibers without harmful byproducts that, responsive to being burned, burn under carbon-carbon processing temperatures, e.g. under 800 degrees Celsius (1472 degrees Fahrenheit). In that regard, fugitive fibers may be made of polyvinyl alcohol (PVA), polyethylene terephthalate (PET), nylon, polyethylene (PE), polyamide imide (PAI), or similar plastic, among others. In various embodiments, fusible fibers may include thermoplastic or thermoset fibers. In that regard, fusible fibers may include polyetheretherketone (PEEK), polyaryleetherketones (PAEK), polyetherketoneketone (PEKK), polyester imide (PEI), polyimide (PI), phenolics, pitch, or similar polymers, among others.

In various embodiments, the fabric layers may then be stacked, in a near net shape tool, with each successive layer containing the desired fiber percentages of fugitive fibers, fusible fibers, and/or carbon fibers thereby forming a commingled fiber preform. In various embodiments, the fiber percentages may be varied such that interior plies of the commingled fiber preform may contain a higher percentage of carbon fibers and a lower percentage of fugitive fibers or fusible fibers while the exterior plies of the commingled fiber preform may conversely contain a lower percentage of carbon fibers and a higher percentage of fugitive fibers or fusible fibers. In various embodiments, during stacking, the fabric layers may be tacked together using a variety of methods, e.g. an adhesive tackifier, a hot iron to locally melt a thermoplastic, or an ultra-sonic thermoplastic welder, among others. In various embodiments, as the commingled fiber preform is stacked, the various fabric layers may be joined through thickness reinforcement (TTR) via needling, tufting, stitching, or z-pinning, using a commingled fiber thread that includes fugitive fibers, fusible fibers, and/or carbon fibers. In various embodiments, once all the fabric layers are stacked, then all the fabric layers are needled, tufted, stitched, or z-pinned together. In various embodiments, as each successive fabric layer is added, then the fabric layers may be needled, tufted, stitched, or z-pinned together. In various embodiments, the needling, tufting, stitching, or z-pinning may penetrate all the fabric layers. In various embodiments, the needling, tufting, stitching, or z-pinning may penetrate only a predefined number of fabric layers. In various embodiments, a number of fabric layers that are needled, tufted, stitched, or z-pinned may vary as the commingled fiber preform is generated. In various embodiments, once the commingled fiber preform is completely stacked and needled, the commingled fiber preform may be placed in a close die mold or vacuum bag tooling and subjected to heat and pressure to consolidate the commingled fiber preform, allowing the fusible and fugitive fibers to wet out, i.e. be completely coated, into the carbon-fiber and create a path through the thickness for infiltration of fluids.

In various embodiments, once consolidation is complete, the commingled fiber preform may undergo pyrolysis where the fugitive fibers in the commingled fiber preform are burned, melted, or evaporated, and the fusible fibers are pyrolyzed into a carbon matrix. In various embodiments, once pyrolysis is complete, the commingled fiber preform may undergo Chemical Vapor Infiltration (CVI) densification. In various embodiments, once the CVI densification is complete, the commingled fiber preform may undergo skim cut machining where the surface of the commingled fiber preform is modified to meet a set of standards for the commingled fiber preform. In various embodiments, the pyrolysis, CVI densification and skim cutting may be repeated until a desired part density is reached. In various embodiments, once the desired part density is reached, a final machining may be performed on the commingled fiber preform to meet desired commingled fiber preform dimensions.

In various embodiments, once consolidation is complete, the commingled fiber preform may undergo polymer infiltration where a thermoset or thermoplastic resin such as phenolic or pitch is injected into the commingled fiber preform and then cured. In various embodiments, once the thermoset resin is cured, the commingled fiber preform may undergo pyrolysis where the fugitive fibers in the commingled fiber preform are burned, melted, or evaporated, and the fusible fibers are pyrolyzed into a carbon matrix. In various embodiments, once pyrolysis is complete, the commingled fiber preform may undergo further densification via Chemical Vapor Infiltration (CVI) densification. In various embodiments, once the CVI densification is complete, the commingled fiber preform may undergo skim cut machining where the surface of the commingled fiber preform is modified to meet a set of standards for the commingled fiber preform. In various embodiments, at least one of polymer infiltration, the pyrolysis, CVI densification and skim cutting may be repeated until a desired part density is reached. In various embodiments, once the desired part density is reached, a final machining may be performed on the commingled fiber preform to meet desired commingled fiber preform dimensions.

Referring now to FIG. 1, in accordance with various embodiments, a fabric layer formed using commingled fibers including percentages of fugitive fibers, fusible fibers, and/or carbon fibers is illustrated. In various embodiments, the fabric layer 100 includes a plurality of tows 102a-102n. In various embodiments, each tow of the plurality of tows 102a-102n includes a percentage of carbon fibers 104, fusible fibers 106, and fugitive fibers 108. In various embodiments, each tow of the plurality of tows 102a-102n includes only carbon fibers 104. In various embodiments, each tow of the plurality of tows 102a-102n includes carbon fibers 104 and either fusible fibers 106 or fugitive fibers 108. In various embodiments, each tow of the plurality of tows 102a-102n includes carbon fibers 104, fusible fibers 106, and fugitive fibers 108. In various embodiments, in a particular fabric layer 100, each tow of the plurality of tows 102a-102n includes the same percentage of carbon fibers 104, fusible fibers 106, and/or fugitive fibers 108. In various embodiments, in a particular fabric layer 100, one or more tows of the plurality of tows 102a-102n may include a different percentage of carbon fibers 104, fusible fibers 106, and/or fugitive fibers 108 than another one or more tows of the plurality of tows 102a-102n. In various embodiments, the fabric layer 100 has a directionality that coincides with the direction of the tows 102a-102n.

Figures 2A, 2B:
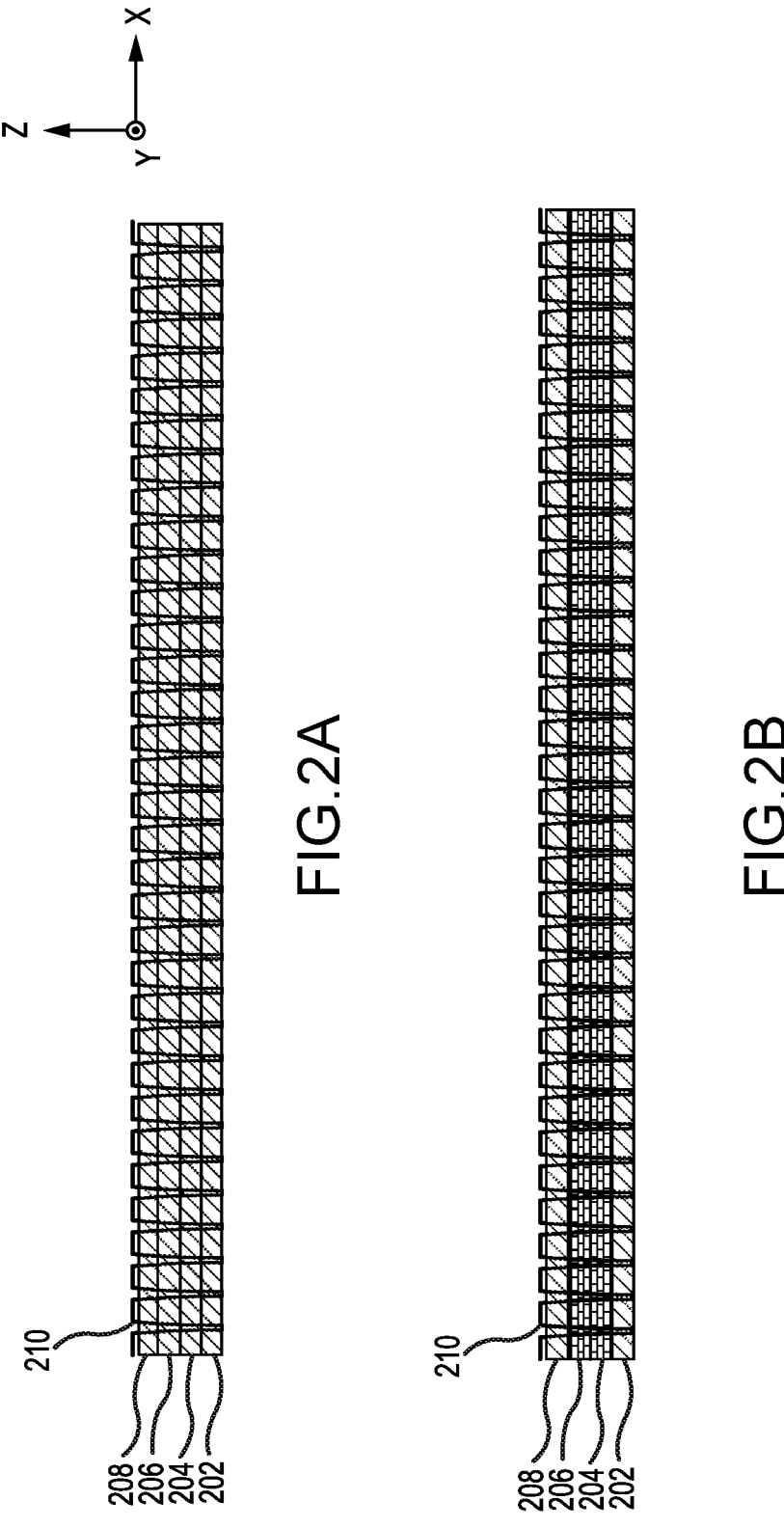
FIGS. 2A and 2B illustrate a commingled fiber preform using commingled fiber fabric layers, in accordance with various embodiments.

Referring now to FIGS. 2A and 2B, in accordance with various embodiments, a commingled fiber preform using commingled fiber fabric layers is illustrated. In various embodiments, as illustrated in FIG. 2A, each of fabric layers 202, 204, 206, and 208 may have consistent percentages of fugitive fibers, fusible fibers, and/or carbon fibers. In various embodiments, each of fabric layers 202, 204, 206, and 208 may include fugitive fibers and carbon fibers where a ratio of fugitive fibers to carbon fibers may be 1:2, 1:3, or 1:4, among others, as long as the carbon fiber percentage is larger than the fugitive fiber percentage. In various embodiments, each of fabric layers 202, 204, 206, and 208 may include fugitive fibers and fusible fibers, where a ratio of fugitive fibers to fusible fibers may be 1:2, 1:3, or 1:4, among others, as long as the fusible fiber percentage is larger than the fugitive fiber percentage. In various embodiments, each of fabric layers 202, 204, 206, and 208 may include fugitive fibers, carbon fibers, and fusible fibers, where a ratio of fugitive fibers to carbon fibers to fusible fibers may be 1:2:2, 1:3:2, 1:2:3, 1:3:3, or 1:4:2, among others, as long as the carbon fiber and fusible fiber percentages are larger than the fugitive fiber percentage. In various embodiments, as illustrated in FIG. 2B, fabric layers 202 and 208 may have a same percentage of fugitive fibers, fusible fibers, and/or carbon fibers and fabric layers 204 and 206, while having a same percentage of fugitive fibers, fusible fibers, and/or carbon fibers, may have a different percentage of fugitive fibers, fusible fibers, and/or carbon fibers from fabric layers 202 and 208. In various embodiments, once the desired number of layers has been reached for the preform ply stack, fabric layers 202, 204, 206, and 208 may be joined through thickness reinforcement (TTR) via external needling, tufting, stitching, or z-pinning, among others. In various embodiments, the TTR utilizes a commingled fiber thread 210 that includes fugitive fibers, fusible fibers, and/or carbon fibers. In various embodiments, commingled fiber thread 210 includes fugitive fibers and carbon fibers where a ratio of fugitive fibers to carbon fibers may be 1:2, 1:3, or 1:4, among others, as long as the carbon fiber percentage is larger than the fugitive fiber percentage. In various embodiments, commingled fiber thread 210 includes fugitive fibers and fusible fibers, where a ratio of fugitive fibers to fusible fibers may be 1:2, 1:3, or 1:4, among others, as long as the fusible fiber percentage is larger than the fugitive fiber percentage. In various embodiments, commingled fiber thread 210 includes fugitive fibers, carbon fibers, and fusible fibers, where a ratio of fugitive fibers to carbon fibers to fusible fibers may be 1:2:2, 1:3:2, 1:2:3, 1:3:3, or 1:4:2, among others, as long as the carbon fiber and fusible fiber percentages are larger than the fugitive fiber percentage. In various embodiments, the TTR is performed in a uniform manner such that a number of needles, tufts, stiches, or z-pins are consistent along a length of the fabric layers 202, 204, 206, and 208 in the x-direction. In various embodiments, a transport depth in the z-direction of the TTR is through all the fabric layers 202, 204, 206, and 208 of the commingled fiber preform for the length of the commingled fiber preform in the x-direction. In various embodiments, generating a commingled fiber preform in this manner takes advantage of random fugitive fiber placement for uniform densification in through thickness direction, while maintaining high in-plane strengths.

Figures 3A, 3B:
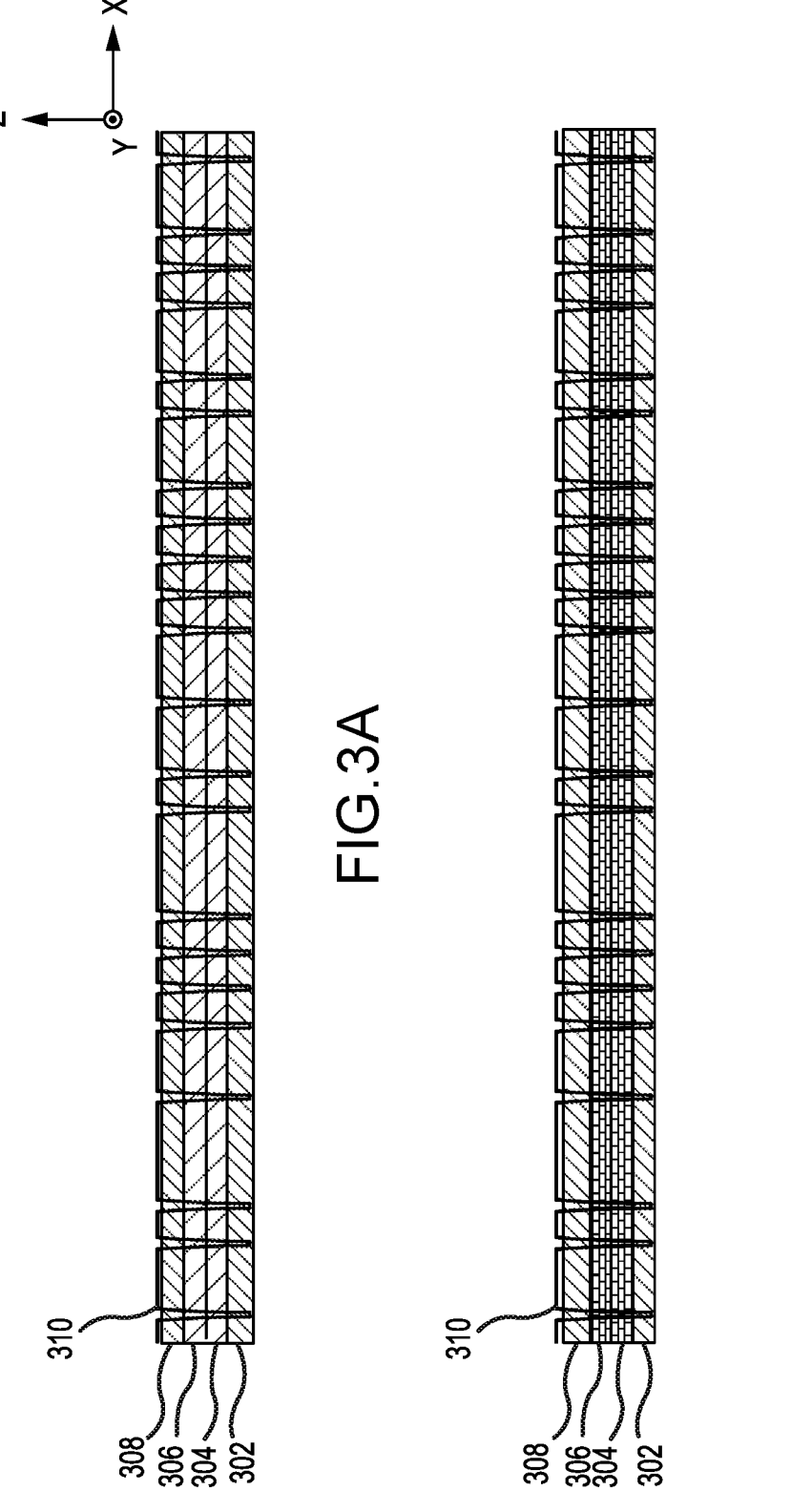
FIGS. 3A and 3B illustrate a commingled fiber preform using commingled fiber fabric layers, in accordance with various embodiments.

Referring now to FIGS. 3A and 3B, in accordance with various embodiments, a commingled fiber preform using commingled fiber fabric layers is illustrated. In various embodiments, as illustrated in FIG. 3A, each of fabric layers 302, 304, 306, and 308 may have a consistent percentage of fugitive fibers, fusible fibers, and/or carbon fibers. In various embodiments, each of fabric layers 302, 304, 306, and 308 may include fugitive fibers and carbon fibers where a ratio of fugitive fibers to carbon fibers may be 1:2, 1:3, or 1:4, among others, as long as the carbon fiber percentage is larger than the fugitive fiber percentage. In various embodiments, each of fabric layers 302, 304, 306, and 308 may include fugitive fibers and fusible fibers, where a ratio of fugitive fibers to fusible fibers may be 1:2, 1:3, or 1:4, among others, as long as the fusible fiber percentage is larger than the fugitive fiber percentage. In various embodiments, each of fabric layers 302, 304, 306, and 308 may include fugitive fibers, carbon fibers, and fusible fibers, where a ratio of fugitive fibers to carbon fibers to fusible fibers may be 1:2:2, 1:3:2, 1:2:3, 1:3:3, or 1:4:2, among others, as long as the carbon fiber and fusible fiber percentages are larger than the fugitive fiber percentage. In various embodiments, as illustrated in FIG. 3B, fabric layers 302 and 308 may have a same percentage of fugitive fibers, fusible fibers, and/or carbon fibers and fabric layers 304 and 306, while having a same percentage of fugitive fibers, fusible fibers, and/or carbon fibers, may have a different percentage of fugitive fibers, fusible fibers, and/or carbon fibers from fabric layers 302 and 308. In various embodiments, once the desired number of layers has been reached for the preform ply stack, fabric layers 302, 304, 306, and 308 may be joined through thickness reinforcement (TTR) via external needling, tufting, stitching, or z-pinning, among others. In various embodiments, the TTR utilizes a commingled fiber thread 310 that includes fugitive fibers, fusible fibers, and/or carbon fibers. In various embodiments, commingled fiber thread 310 includes fugitive fibers and carbon fibers, where a ratio of fugitive fibers to carbon fibers may be 1:2, 1:3, or 1:4, among others, as long as the carbon fiber percentage is larger than the fugitive fiber percentage. In various embodiments, commingled fiber thread 310 includes fugitive fibers and fusible fibers, where a ratio of fugitive fibers to fusible fibers may be 1:2, 1:3, or 1:4, among others, as long as the fusible fiber percentage is larger than the fugitive fiber percentage. In various embodiments, commingled fiber thread 310 includes fugitive fibers, carbon fibers, and fusible fibers, where a ratio of fugitive fibers to carbon fibers to fusible fibers may be 1:2:2, 1:3:2, 1:2:3, 1:3:3, or 1:4:2, among others, as long as the carbon fiber and fusible fiber percentages are larger than the fugitive fiber percentage. In various embodiments, the through thickness reinforcement (TTR) is performed in a random manner such that a number of needles, tufts, stiches, or z-pins vary along a length of the fabric layers 202, 204, 206, and 208 in the x-direction. In various embodiments, a transport depth in the z-direction of the TTR is though all of the fabric layers 202, 204, 206, and 208 of the commingled fiber preform for the length of the commingled fiber preform in the x-direction. In various embodiments, generating a commingled fiber preform in this manner takes advantage of random fugitive fiber placement for uniform densification.

Figures 4, 5:
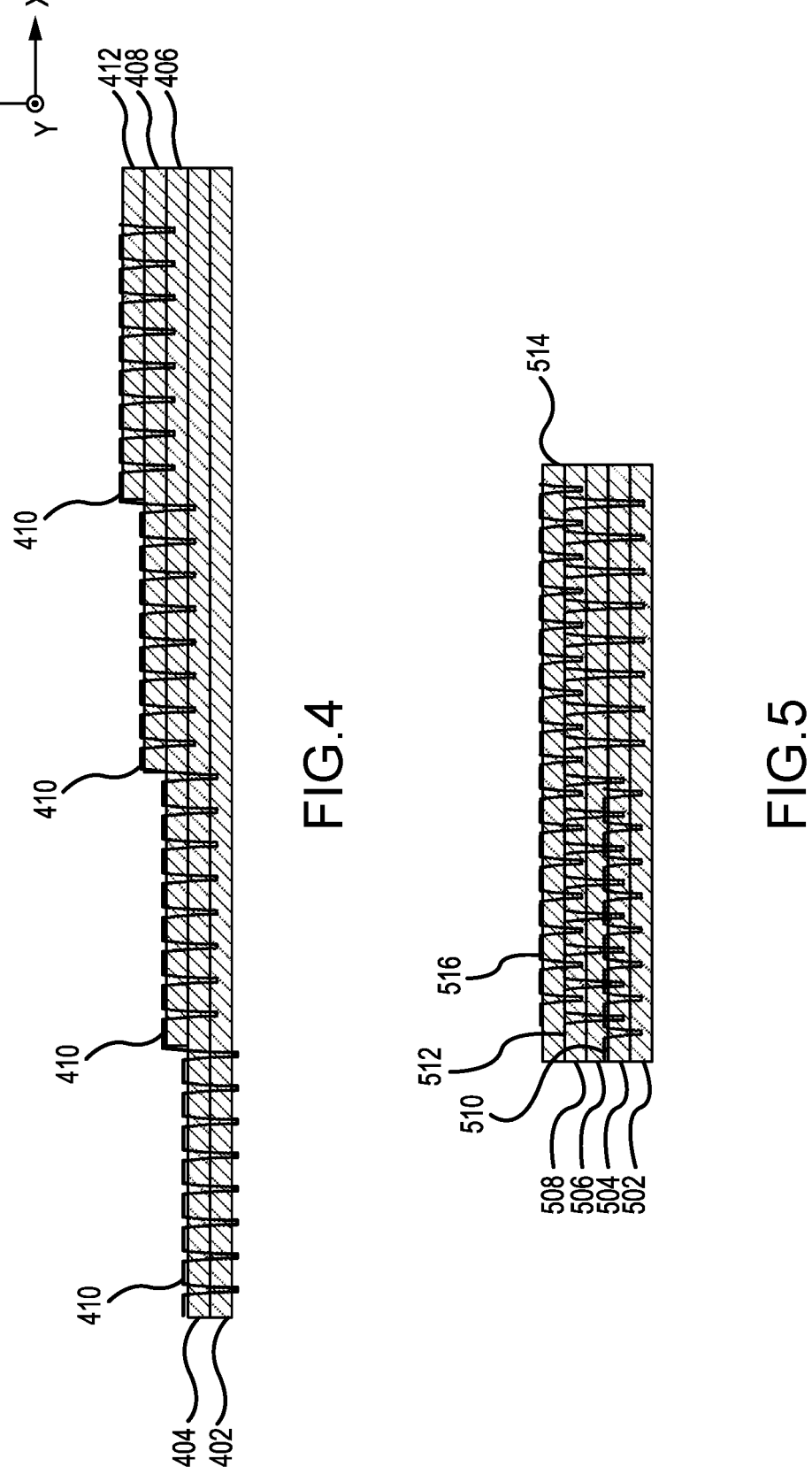
FIG. 4 illustrates through thickness reinforcement (TTR) of a commingled fiber preform where a transport depth coincides with the number of fabric layers added to the preform, in accordance with various embodiments.
FIG. 5 illustrates through thickness reinforcement (TTR) of a commingled fiber preform where a transport depth of the TTR varies with regard to a number of fabric layers as well as length of the commingled fiber preform, in accordance with various embodiments.

Referring now to FIG. 4, in accordance with various embodiments, through thickness reinforcement (TTR) of a commingled fiber preform where a transport depth coincides with the number of fabric layers added to the commingled fiber preform is illustrated. In various embodiments, a transport depth in the z-direction of the TTR only penetrates a current fabric layer and an immediate previous fabric layer. In that regard, responsive to fabric layer 404 being laid on top of fabric layer 402, the TTR using commingled fiber thread 410 penetrates the fabric layer 404 and fabric layer 402. Responsive to fabric layer 406 being laid on top of fabric layer 404, the TTR using commingled fiber thread 410 penetrates only fabric layer 406 and fabric layer 404. Responsive to fabric layer 408 being laid on top of fabric layer 406, the TTR using commingled fiber thread 410 penetrates only fabric layer 408 and fabric layer 406. Responsive to fabric layer 412 being laid on top of fabric layer 408, the TTR using commingled fiber thread 410 penetrates only fabric layer 412 and fabric layer 408. In various embodiments, the TTR utilizes a commingled fiber thread 410 that includes fugitive fibers, fusible fibers, and/or carbon fibers. In various embodiments, commingled fiber thread 410 includes fugitive fibers and carbon fibers. In various embodiments, commingled fiber thread 410 includes fugitive fibers and fusible fibers. In various embodiments, commingled fiber thread 410 includes fugitive fibers, carbon fibers, and fusible fibers.

Referring now to FIG. 5, in accordance with various embodiments, through thickness reinforcement (TTR) of a commingled fiber preform where a transport depth of the TTR varies with regard to a number of fabric layers as well as length of the commingled fiber preform is illustrated. In various embodiments, responsive to fabric layer 504 being laid on top of fabric layer 502, the TTR using commingled fiber thread 510 penetrates completely through a thickness of the fabric layer 504 and partially through a thickness of fabric layer 502 but only for a portion of the length of the commingled fiber preform in the x-direction. Responsive to fabric layer 506 being laid on top of fabric layer 504 and then fabric layer 508 being laid on top of fabric layer 506, the TTR using commingled fiber thread 512 penetrates completely through a thickness of the fabric layers 508 and 506 and partially through a thickness of the fabric layer 504 for a first portion of the length of the commingled fiber preform in the x-direction and then penetrates completely through a thickness of fabric layers 508, 506, and 504 and partially through a thickness of fabric layer 502 for a second portion of the length of the commingled fiber preform in the x-direction. Responsive to fabric layer 514 being laid on top of fabric layer 508, the TTR using commingled fiber thread 516 penetrates completely through a thickness of fabric layer 514 and partially though a thickness of fabric layer 508 for the first portion and the second portion of the length of the commingled fiber preform in the x-direction. In various embodiments, the commingled fiber threads 510, 512, and 516 may include fugitive fibers, fusible fibers, and/or carbon fibers. In various embodiments, the commingled fiber threads 510, 512, and 516 may include fugitive fibers and carbon fibers. In various embodiments, the commingled fiber threads 510, 512, and 516 may include fugitive fibers and fusible fibers. In various embodiments, the commingled fiber threads 510, 512, and 516 may include fugitive fibers, carbon fibers, and fusible fibers. In various embodiments, generating a commingled fiber preform in this manner takes advantage of random fugitive fiber placement for targeted densification in through thickness direction, while maintaining high in-plane strengths.

Figure 6:
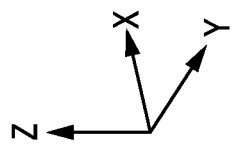
FIG. 6 illustrates a multi-axial non-woven commingled fiber preform, in accordance with various embodiments.
Figure 6:
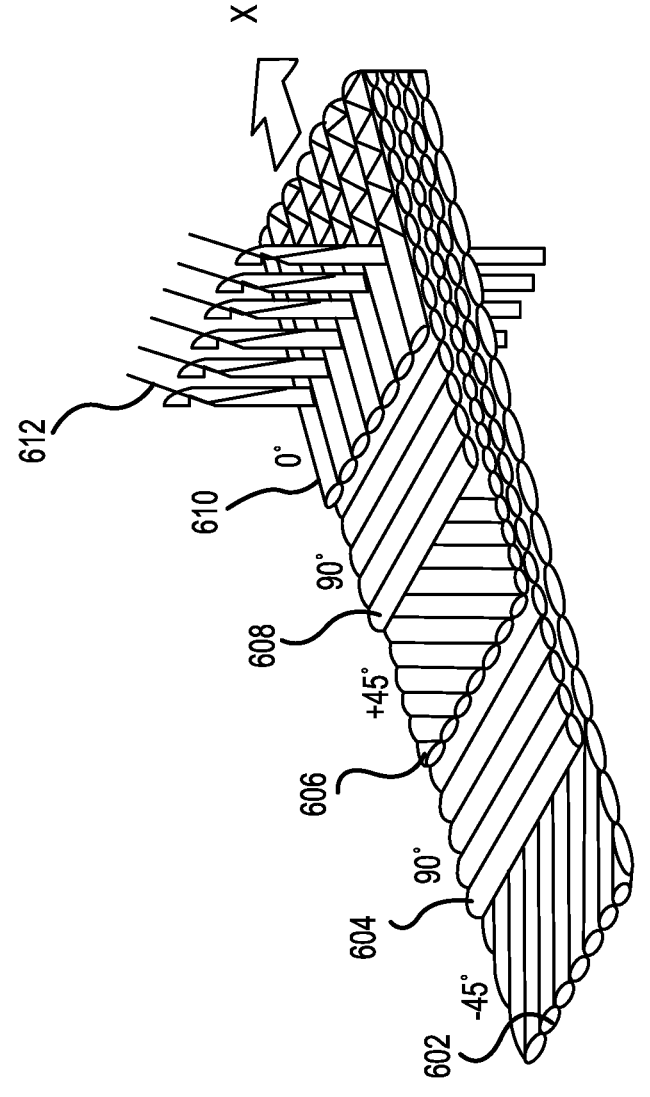

Referring now to FIG. 6, in accordance with various embodiments, a multi-axial non-woven commingled fiber preform is illustrated. In various embodiments, the multi-axial non-woven commingled fiber preform 600 includes a first fabric layer 602 positioned such that its directionality, which coincides with the direction of the tows, is at a first angle, i.e. −45 degrees with respect to the x-axis. In various embodiments, a second fabric layer 604 is laid on top of the first fabric layer 602 and positioned such that its directionality is at a second angle, i.e. 90 degrees with respect to the x-axis. In various embodiments, a third fabric layer 606 is laid on top of the second fabric layer 604 and positioned such that its directionality is at a third angle, i.e. +45 degrees with respect to the x-axis. In various embodiments, a fourth fabric layer 608 is laid on top of the third fabric layer 609 and positioned such that its directionality is at the second angle, i.e. 90 degrees with respect to the x-axis. In various embodiments, a fifth fabric layer 610 is laid on top of the fourth fabric layer 608 and positioned such that its directionality is at a fourth angle, i.e. 0 degrees with respect to the x-axis. In various embodiments, the multi-axial non-woven commingled fiber preform 600 that includes fabric layers 602-610 provides for each fabric layer to be tailored dependent on the location within the commingled fiber preform and whether high or low warp strength is required. In various embodiments, the multi-axial non-woven commingled fiber preform 600 is ideal for complex shapes which may require laying up on complex contour surfaces, where warp strength differentials may be preferred, which allows for the tailoring of in-plane strengths in certain directions and in certain regions. In various embodiments, once the multi-axial non-woven commingled fiber preform 600 that includes fabric layers 602-610 is laid up, the multi-axial non-woven commingled fiber preform undergoes through thickness reinforcement (TTR) such as the TTR described in FIGS. 2A, 2B, 3A, 3B, 4, and 5. In various embodiments, the TTR utilizes a commingled fiber thread 612 that includes fugitive fibers, fusible fibers, and/or carbon fibers. In various embodiments, commingled fiber thread 612 includes fugitive fibers and carbon fibers. In various embodiments, commingled fiber thread 612 includes fugitive fibers and fusible fibers. In various embodiments, commingled fiber thread 612 includes fugitive fibers, carbon fibers, and fusible fibers.

Referring now to FIGS. 7A-7F, in accordance with various embodiments, a woven fabric for use as a fabric layer to be utilized in the embodiments of FIGS. 2A, 2B, 3A, 3B, 4, 5, and 6 is illustrated. In various embodiments, commingled fibers in the warp direction, i.e. in a first direction in the y-direction may include fugitive fibers, fusible fibers, and/or carbon fibers. Likewise, in various embodiments, commingled fibers in the warp direction, i.e. in a second direction in the x-direction may also include fugitive fibers, fusible fibers, and/or carbon fibers. In that regard, in various embodiments, commingled fibers in the warp or weft directions may include fugitive fibers and carbon fibers where a ratio of fugitive fibers to carbon fibers may be 1:2, 1:3, or 1:4, among others, as long as the carbon fiber percentage is larger than the fugitive fiber percentage. In various embodiments, commingled fibers in the warp or weft directions may include fugitive fibers and fusible fibers, where a ratio of fugitive fibers to fusible fibers may be 1:2, 1:3, or 1:4, among others, as long as the fusible fiber percentage is larger than the fugitive fiber percentage. In various embodiments, commingled fibers in the warp or weft directions may include fugitive fibers, carbon fibers, and fusible fibers, where a ratio of fugitive fibers to carbon fibers to fusible fibers may be 1:2:2, 1:3:2, 1:2:3, 1:3:3, or 1:4:2, among others, as long as the carbon fiber and fusible fiber percentages are larger than the fugitive fiber percentage.

Figure 7A:
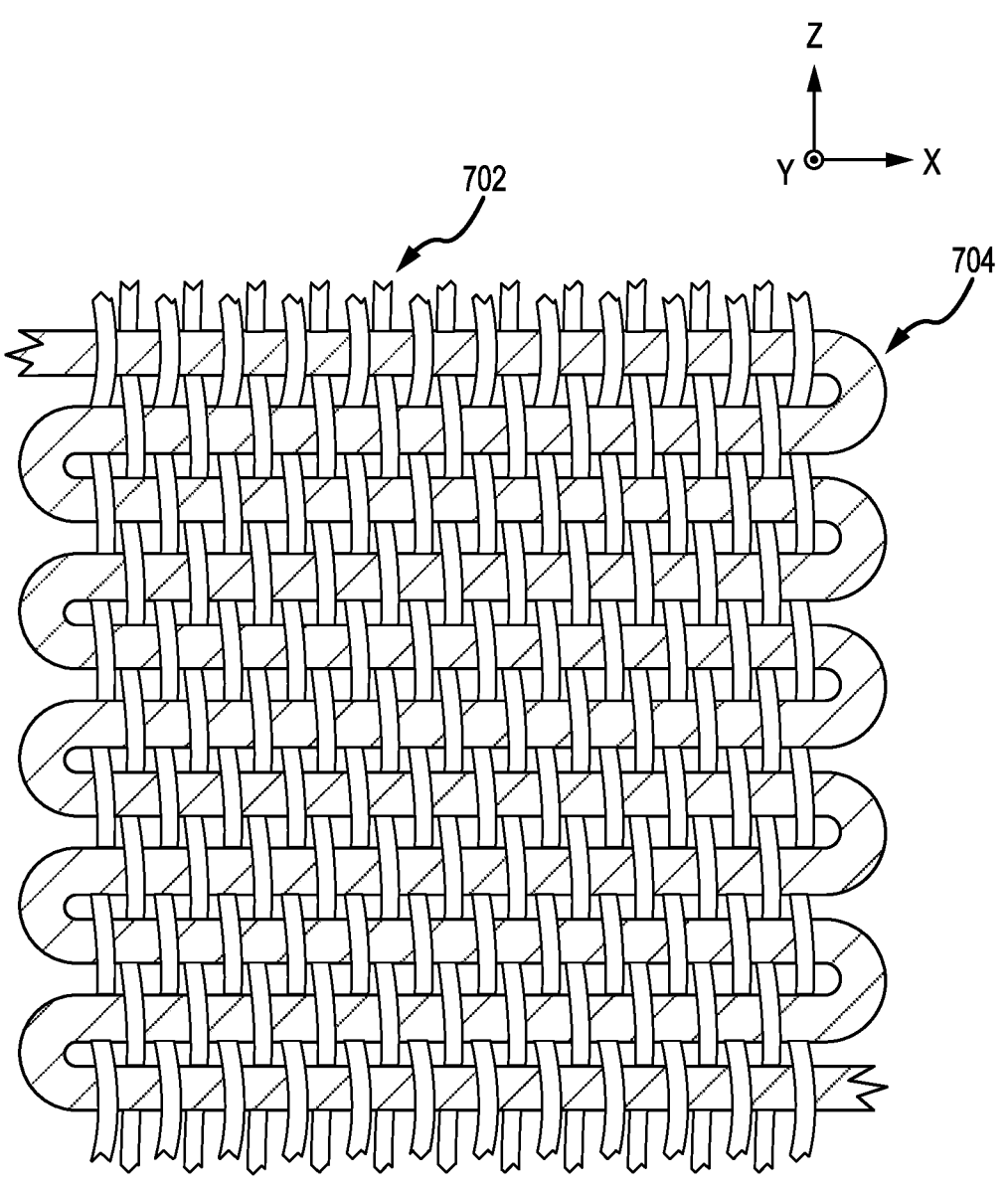
FIGS. 7A, 7B, 7C, 7D, 7E, and 7F illustrate a woven fabric for use as a fabric layer to be utilized in the embodiments of FIGS. 2A, 2B, 3A, 3B, 4, 5, and 6, in accordance with various embodiments.
Figure 7B:
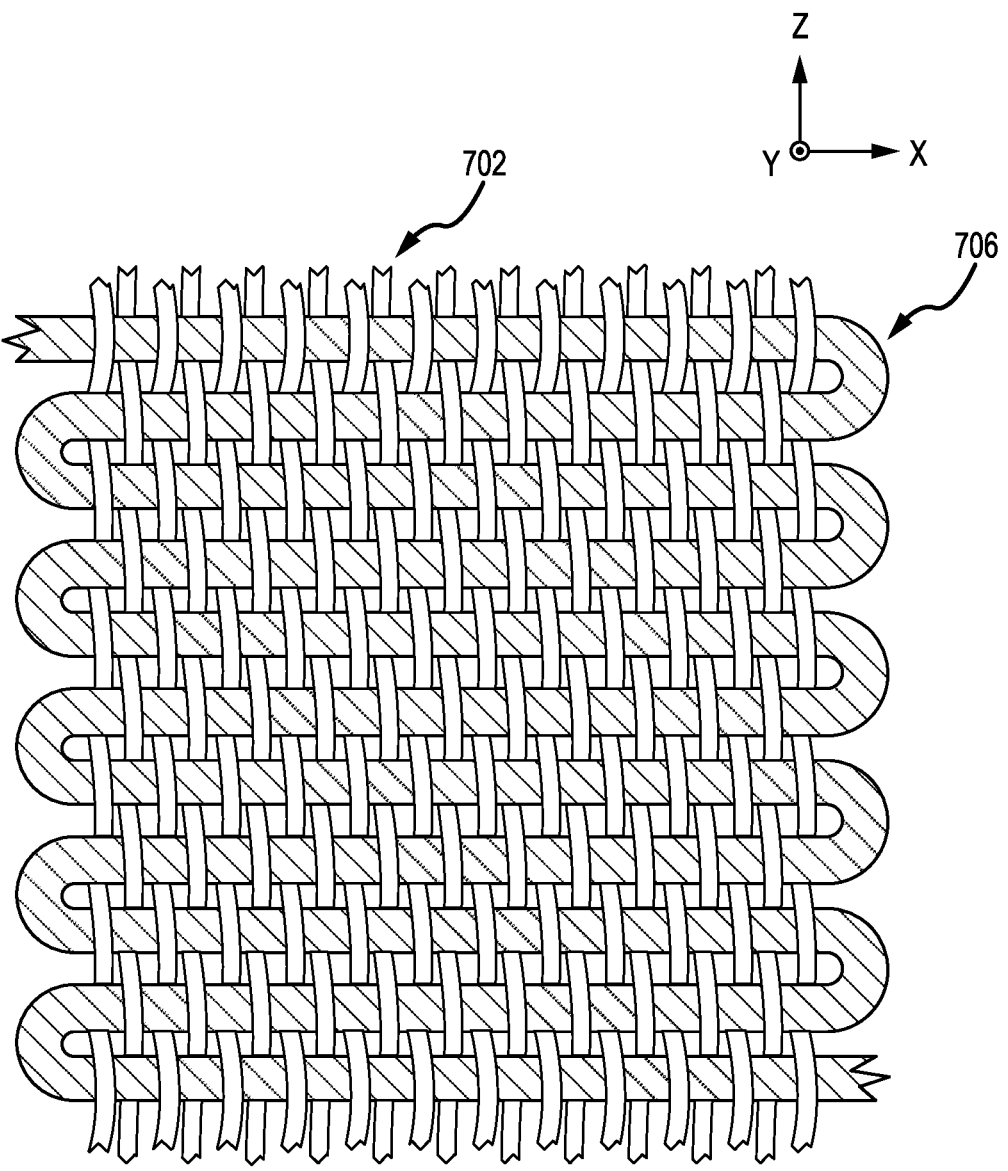
Figure 7C:
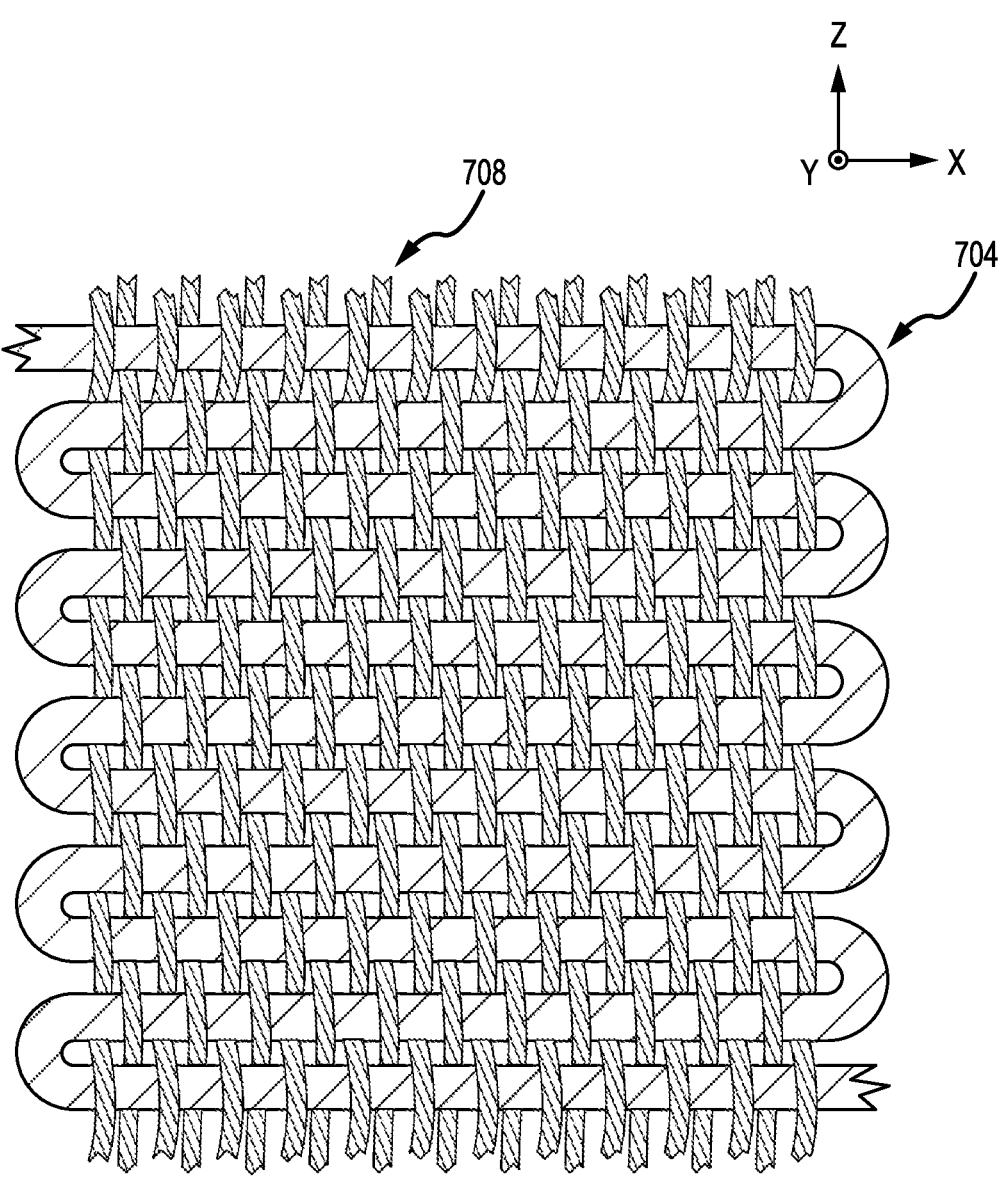
Figure 7D:
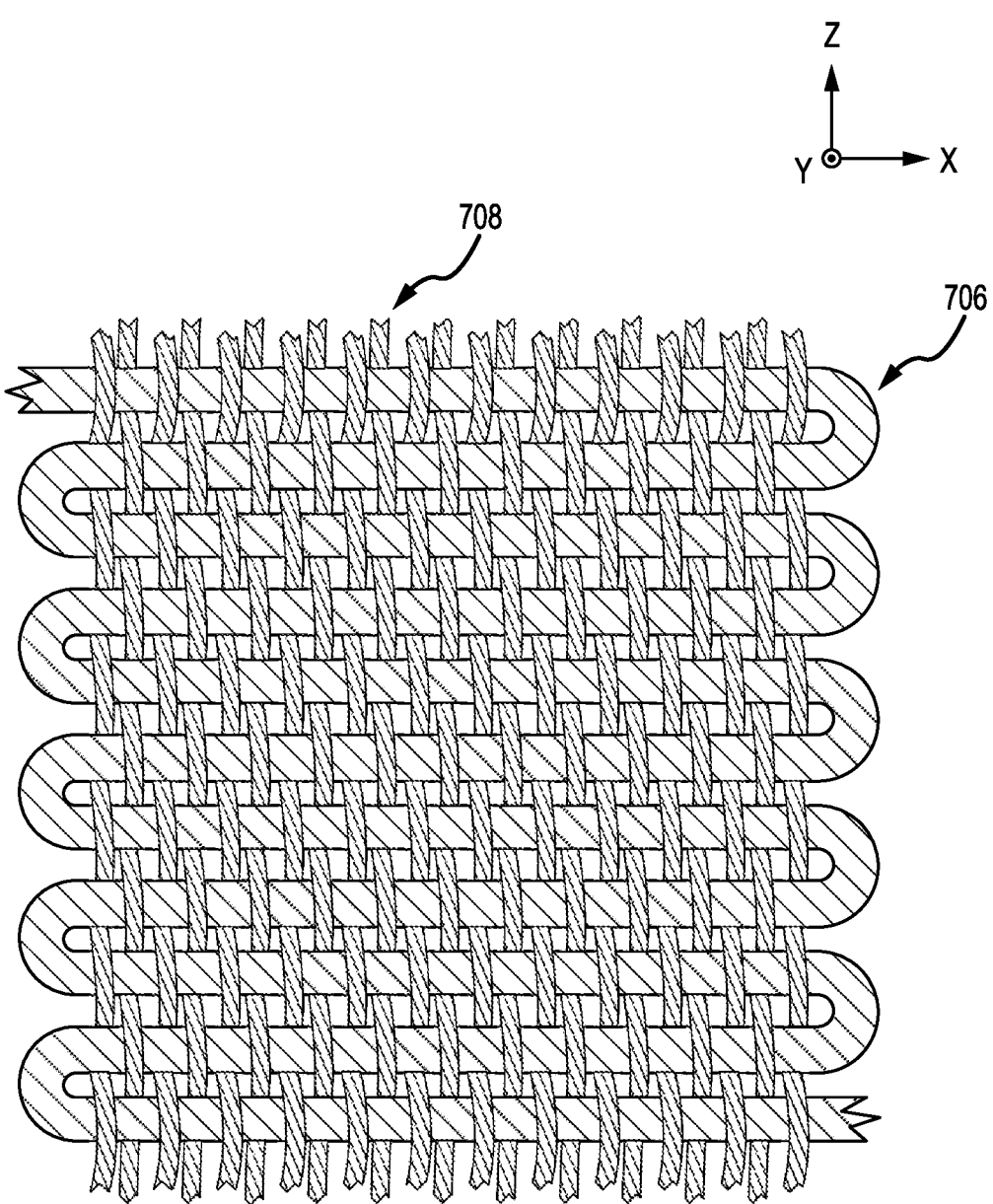
Figure 7E:
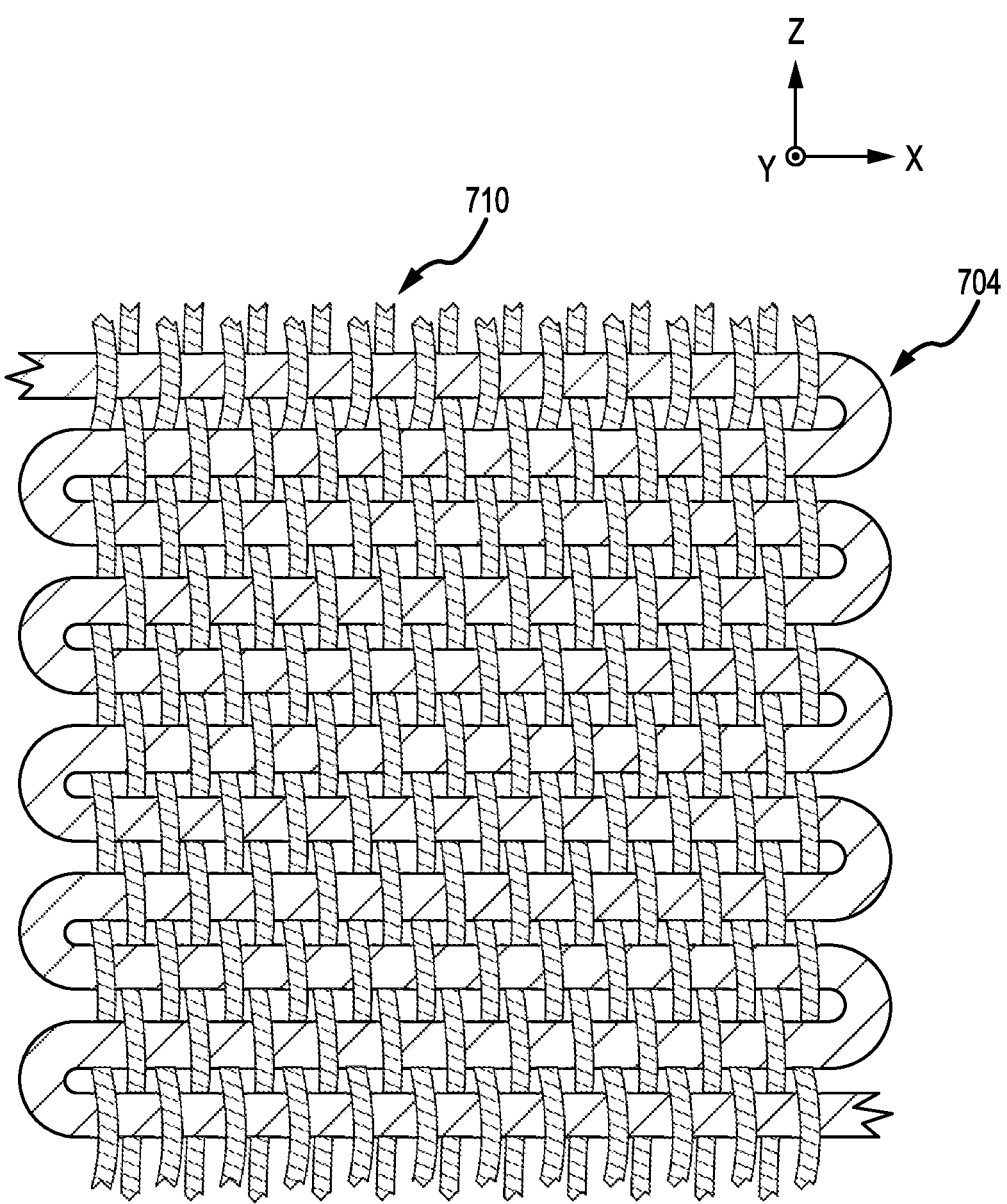
Figure 7F:
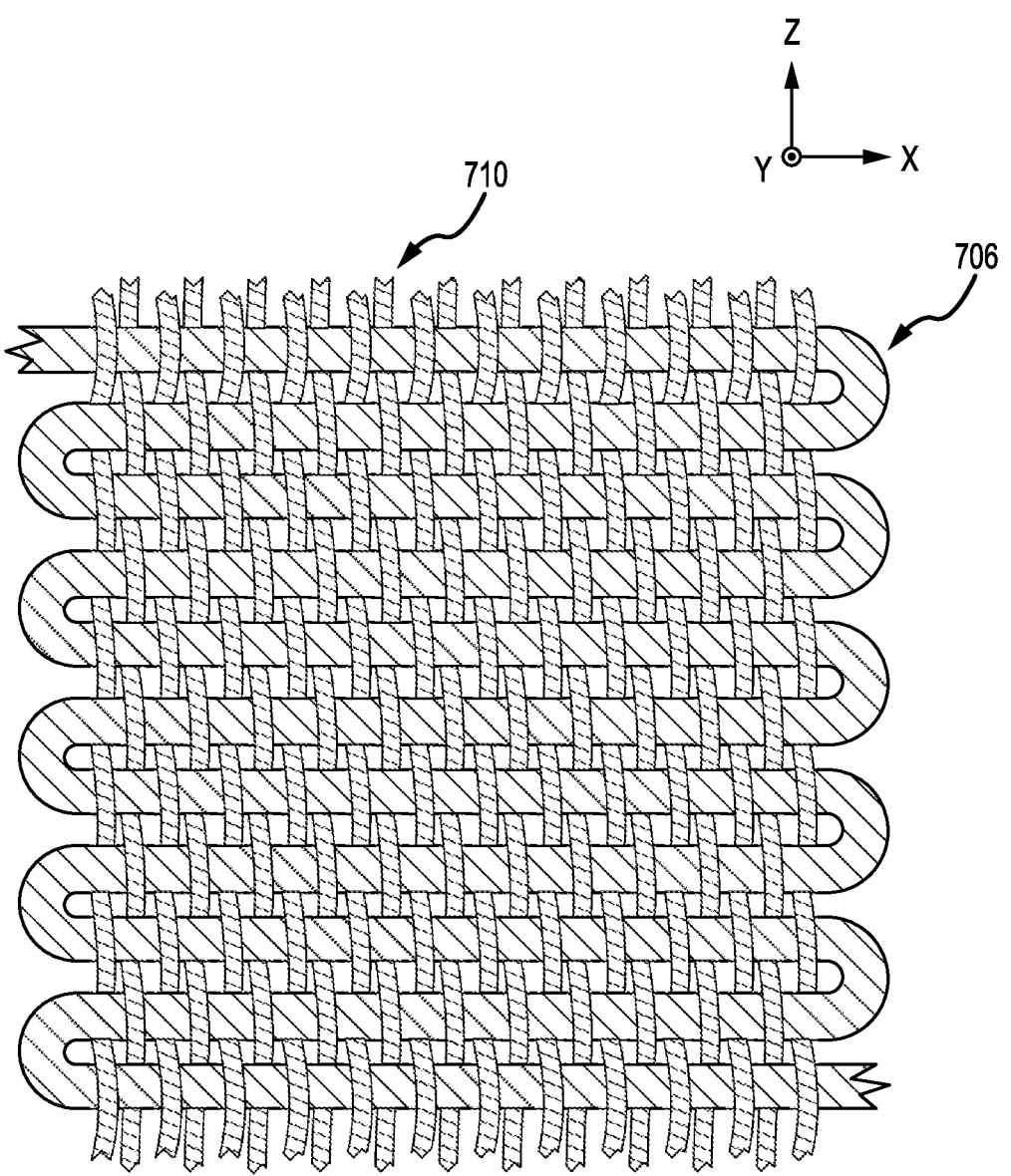

In FIG. 7A, the commingled fibers 702 in the warp direction include fusible fibers and fugitive fibers and the commingled fibers 704 in the weft direction include only carbon fibers. In FIG. 7B, the commingled fibers 702 in the warp direction include fusible fibers and fugitive fibers and the commingled fibers 706 in the weft direction include carbon fibers and fusible fibers. In FIG. 7C, the commingled fibers 708 in the warp direction include carbon fibers and fugitive fibers and the commingled fibers 704 in the weft direction include only carbon fibers. In FIG. 7D, the commingled fibers 708 in the warp direction include carbon fibers and fugitive fibers and the commingled fibers 706 in the weft direction include carbon fibers and fusible fibers. In FIG. 7E, the commingled fibers 710 in the warp direction include carbon fibers, fusible fibers, and fugitive fibers and the commingled fibers 704 in the weft direction include only carbon fibers. In FIG. 7F, the commingled fibers 710 in the warp direction include carbon fibers, fusible fibers, and fugitive fibers and the commingled fibers 706 in the weft direction include carbon fibers and fusible fibers. In various embodiments, tailoring of in-plane strengths of the fabric layer in certain directions, may result in the creation of a quasi-unidirectional fabric layer in a finished composite. In various embodiments, changing the mix of carbon fibers and fusible fibers in the weft directions may provide for an advantageous strength differential between warp and weft directions.

Figure 8:
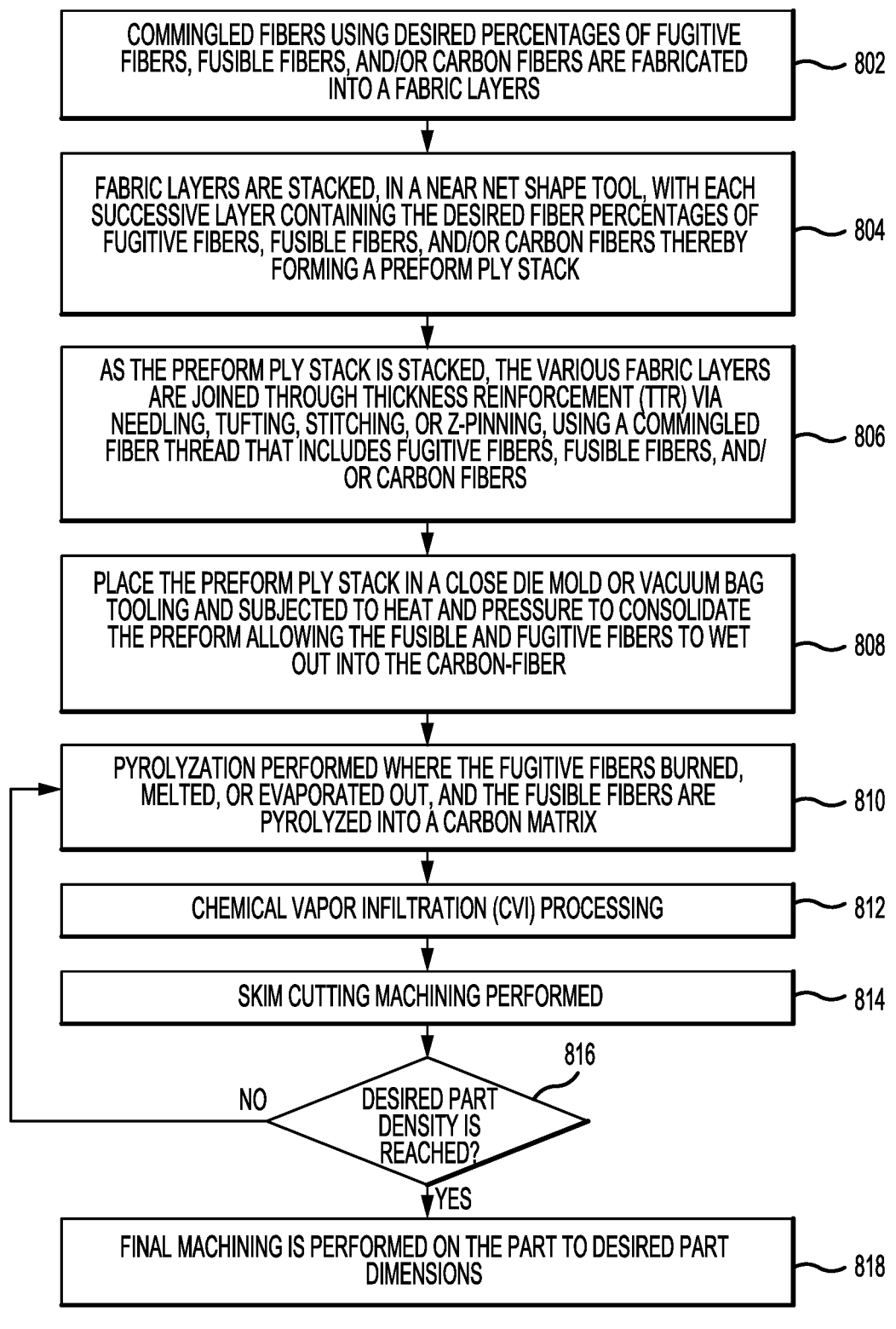
FIG. 8 illustrates a method of forming a commingled fiber preform for a high temperature composite, in accordance with various embodiments.

Referring now to FIG. 8, in accordance with various embodiments, a method of forming a commingled fiber preform for a high temperature composite is illustrated. At block 802, commingled fibers using desired percentages of fugitive fibers, fusible fibers, and/or carbon fibers are fabricated into a fabric layers of either woven fabric layers, a non-crimp fabric layers, such as unidirectional or stitched unidirectional, or a felt fabric layers. At block 804, the fabric layers are stacked, in a near net shape tool, with each successive layer containing the desired fiber percentages of fugitive fibers, fusible fibers, and/or carbon fibers thereby forming a commingled fiber preform. At block 806, as the commingled fiber preform is stacked, the various fabric layers may be joined through thickness reinforcement (TTR) via needling, tufting, stitching, or z-pinning, using a commingled fiber thread that includes fugitive fibers, fusible fibers, and/or carbon fibers. At block 808, once the commingled fiber preform is completely stacked and needled, the commingled fiber preform may be placed in a close die mold or vacuum bag tooling and subjected to heat and pressure to consolidate the commingled fiber preform allowing the fusible and fugitive fibers to wet out into the carbon fiber and create a path through the thickness for infiltration of fluids.

At block 810, once consolidation is complete, the commingled fiber preform undergoes pyrolysis where the fugitive fibers in the commingled fiber preform are burned, melted, or evaporated, and the fusible fibers are pyrolyzed into a carbon matrix. At block 812, once pyrolysis is complete, the commingled fiber preform may undergo Chemical Vapor Infiltration (CVI) densification. At block 814, once the CVI densification is complete, the commingled fiber preform may undergo skim cut machining where the surface of the commingled fiber preform modified to meet a set of standards for the commingled fiber preform. At block 816 a determination is made as to whether a desired part density is reached. If at block 816 the desired part density has not been reached, the operation returns to block 810. If at block 816 the desired part density has been reached, then, at block 818, a final machining may be performed on the commingled fiber preform to meet desired commingled fiber preform dimensions.

Referring now to FIG. 9, in accordance with various embodiments, a method of forming a commingled fiber preform for a high temperature composite is illustrated. At block 902, commingled fibers using desired percentages of fugitive fibers, fusible fibers, and/or carbon fibers are fabricated into a fabric layers of either woven fabric layers, a non-crimp fabric layers, such as unidirectional or stitched unidirectional, or a felt fabric layers. At block 904, the fabric layers are stacked, in a near net shape tool, with each successive layer containing the desired fiber percentages of fugitive fibers, fusible fibers, and/or carbon fibers thereby forming a commingled fiber preform. At block 906, as the commingled fiber preform is stacked, the various fabric layers may be joined through thickness reinforcement (TTR) via needling, tufting, stitching, or z-pinning, using a commingled fiber thread that includes fugitive fibers, fusible fibers, and/or carbon fibers. At block 908, once the commingled fiber preform is completely stacked and needled, the commingled fiber preform may be placed in a close die mold or vacuum bag tooling and subjected to heat and pressure to consolidate the commingled fiber preform allowing the fusible and fugitive fibers to wet out into the carbon fiber and create a path through the thickness for infiltration of fluids.

At block 910, once consolidation is complete, the commingled fiber preform may undergo polymer infiltration where a thermoset resin, i.e. fluids, such as phenolic is injected into the commingled fiber preform and then cured. At block 912, once the thermoset resin is cured, the commingled fiber preform undergoes pyrolysis where the fugitive fibers in the commingled fiber preform are burned, melted, or evaporated out, and the fusible fibers are pyrolyzed into a carbon matrix. At block 914, once pyrolysis is complete, the commingled fiber preform may undergo Chemical Vapor Infiltration (CVI) densification. At block 916, once the CVI densification is complete, the commingled fiber preform may undergo skim cut machining where the surface of the commingled fiber preform modified to meet a set of standards for the commingled fiber preform. At block 918 a determination is made as to whether a desired part density is reached. If at block 918 the desired part density has not been reached, the operation returns to block 910. If at block 918 the desired part density has been reached, then, at block 920, a final machining may be performed on the commingled fiber preform to meet desired commingled fiber preform dimensions.

In various embodiments, once consolidation is complete, the commingled fiber preform may undergo polymer infiltration where a thermoset resin such as phenolic is injected into the commingled fiber preform and then cured. In various embodiments, once the thermoset resin is cured, the commingled fiber preform may undergo pyrolysis where the fugitive fibers in the commingled fiber preform are burned, melted, or evaporated out, and the fusible fibers are pyrolyzed into a carbon matrix. In various embodiments, once pyrolysis is complete, the commingled fiber preform may undergoes Chemical Vapor Infiltration (CVI) densification. In various embodiments, once the CVI densification is complete, the commingled fiber preform may undergo skim cut machining where the surface of the commingled fiber preform modified to meet a set of standards for the commingled fiber preform. In various embodiments, the polymer infiltration, the pyrolysis, CVI densification and skim cutting may be repeated until a desired part density is reached. In various embodiments, once the desired part density is reached, a final machining may be performed on the commingled fiber preform to meet desired commingled fiber preform dimensions.

Therefore, the illustrative embodiments provide for the creation of complex contour fibrous preforms, with a variety of thicknesses, which take advantage of commingled fibers. Carbon and fugitive commingled fibers enable the commingled fiber preform to take advantage of high strength properties from the carbon fibers, and yield more uniform densification than traditional carbon fiber preforms. The addition of carbon and fusible commingled fibers enable higher densification yields in thick sections or complex contour geometries.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A preform comprising:
first fabric layers, wherein first fabric layers comprises:
    a first set of commingled fibers, wherein the first set of commingled fibers comprises first fugitive fibers commingled with at least one of first carbon fibers or first fusible fibers; and
    a second set of commingled fibers, wherein the second set of commingled fibers comprises second carbon fibers and wherein the first set of commingled fibers is arranged in a first direction with the second set of commingled fibers is arranged in a second direction; and
a second fabric layer positioned between the first fabric layers, wherein the second fabric layer comprises:
    a third set of commingled fibers, wherein the third set of commingled fibers comprises third fugitive fibers commingled with at least one of third carbon fibers or third fusible fibers; and
    a fourth set of commingled fibers, wherein the fourth set of commingled fibers comprises fourth carbon fibers and wherein the third set of commingled fibers is arranged in the first direction with the fourth set of commingled fibers arranged in the second direction,
wherein the first set of commingled fibers comprise a higher percentage of first fugitive fibers than the third set of commingled fibers,
wherein the first fugitive fibers and the third fugitive fibers are pyrolyzed from the first fabric layers and the second fabric layer to create a path through a thickness of the first fabric layers and the second fabric layer for infiltration of fluids,
wherein the first fugitive fibers and the third fugitive fibers are comprised of a polymer with a combined char yield of 5% or less by weight, and a residual mass of less than 1% by weight, and
wherein the first fusible fibers and the third fusible fibers are comprised of a polymer with a combined char yield of 25% or greater by weight and a residual mass of less than 1% by weight.

2. The preform of claim 1, wherein the first set of commingled fibers comprise a lower percentage of the at least one of first carbon fibers or first fusible fibers than the third set of commingled fibers.

3. The preform of claim 1, wherein a percentage of at least one of the first carbon fibers or the first fusible fibers exceeds a percentage of the first fugitive fibers in the first set of commingled fibers and wherein a percentage of at least one of the third carbon fibers or the third fusible fibers exceeds a percentage of the third fugitive fibers in the third set of commingled fibers.

4. The preform of claim 1, wherein the second set of commingled fibers further comprise second fusible fibers and wherein the fourth set of commingled fibers further comprise fourth fusible fibers.

5. The preform of claim 1, wherein the second set of commingled fibers further comprise second fugitive fibers, wherein the second fugitive fibers are pyrolyzed from the first fabric layers, wherein the fourth set of commingled fibers further comprise fourth fugitive fibers, and wherein the fourth fugitive fibers are pyrolyzed from the second fabric layer.

6. The preform of claim 5, wherein a percentage of the second carbon fibers in the second set of commingled fibers exceeds a percentage of the second fugitive fibers in the second set of commingled fibers and wherein a percentage of the fourth carbon fibers in the fourth set of commingled fibers exceeds a percentage of the fourth fugitive fibers in the fourth set of commingled fibers.

7. The preform of claim 1, wherein the second set of commingled fibers further comprise second fusible fibers and second fugitive fibers, wherein the second fugitive fibers are pyrolyzed from the first fabric layers, wherein the fourth set of commingled fibers further comprise fourth fusible fibers and fourth fugitive fibers, wherein the fourth fugitive fibers are pyrolyzed from the second fabric layer, wherein a percentage of the second carbon fibers in the second set of commingled fibers exceeds a percentage of the second fugitive fibers in the second set of commingled fibers and wherein a percentage of the fourth carbon fibers in the fourth set of commingled fibers exceeds a percentage of the fourth fugitive fibers in the fourth set of commingled fibers.

8. The preform of claim 1, wherein, responsive to the first carbon fibers being commingled with the first fugitive fibers, a percentage of the first carbon fibers in the first set of commingled fibers exceeds a percentage of the first fugitive fibers in the first set of commingled fibers and wherein, responsive to the third carbon fibers being commingled with the third fugitive fibers, a percentage of the third carbon fibers in the third set of commingled fibers exceeds a percentage of the third fugitive fibers in the third set of commingled fibers.

9. The preform of claim 1, wherein, responsive to the first fusible fibers being commingled with the first fugitive fibers, a percentage of the first fusible fibers in the first set of commingled fibers exceeds a percentage of the first fugitive fibers in the first set of commingled fibers and wherein, responsive to the third fusible fibers being commingled with the third fugitive fibers, a percentage of the third fusible fibers in the third set of commingled fibers exceeds a percentage of the third fugitive fibers in the third set of commingled fibers.

10. The preform of claim 1, wherein, responsive to the first carbon fibers and the first fusible fibers being commingled with the first fugitive fibers, a percentage of the first carbon fibers in the first set of commingled fibers exceeds a percentage of the first fugitive fibers in the first set of commingled fibers and wherein, responsive to the third carbon fibers and the third fusible fibers being commingled with the third fugitive fibers, a percentage of the third carbon fibers in the third set of commingled fibers exceeds a percentage of the third fugitive fibers in the third set of commingled fibers.

11. A manufacturing method, comprising:
  forming first fabric layers for a commingled fiber preform by arranging a first set of commingled fibers in a first direction with a second set of commingled fibers in a second direction, wherein the first set of commingled fibers comprises first fugitive fibers commingled with at least one of first carbon fibers or first fusible fibers commingled with first fugitive fibers and wherein the second set of commingled fibers comprises second carbon fibers;
  forming a second fabric layer for the commingled fiber preform by arranging a third set of commingled fibers in the first direction with a fourth set of commingled fibers in the second direction, wherein the third set of commingled fibers comprises third fugitive fibers commingled with at least one of third carbon fibers or third fusible fibers and wherein the fourth set of commingled fibers comprises fourth carbon fibers; and
  positioning the second fabric layer between the first fabric layers,
  wherein the first set of commingled fibers comprise a lower percentage of the at least one of first carbon fibers or first fusible fibers than the third set of commingled fibers,
  wherein the first set of commingled fibers comprise a higher percentage of first fugitive fibers than the third set of commingled fibers,
  wherein the first fugitive fibers and the third fugitive fibers are pyrolyzed from the first fabric layers and the second fabric layer to create a path through a thickness of the first fabric layers and the second fabric layer for infiltration of fluids,
  wherein the first fugitive fibers and the third fugitive fibers are comprised of a polymer with a combined char yield of 5% or less by weight, and a residual mass of less than 1% by weight, and
  wherein the first fusible fibers and the third fusible fibers are comprised of a polymer with a combined char yield of 25% or greater by weight and a residual mass of less than 1% by weight.

12. The manufacturing method of claim 11, wherein the first set of commingled fibers comprise a lower percentage of the at least one of first carbon fibers or first fusible fibers than the third set of commingled fibers.

13. The manufacturing method of claim 11, wherein a percentage of at least one of the first carbon fibers or the first fusible fibers exceeds a percentage of the first fugitive fibers in the first set of commingled fibers and wherein a percentage of at least one of the third carbon fibers or the third fusible fibers exceeds a percentage of the third fugitive fibers in the third set of commingled fibers.

14. The manufacturing method of claim 11, wherein the second set of commingled fibers further comprise second fusible fibers and wherein the fourth set of commingled fibers further comprise fourth fusible fibers.

15. The manufacturing method of claim 11, wherein the second set of commingled fibers further comprise second fugitive fibers, wherein the second fugitive fibers are pyrolyzed from the first fabric layers, wherein the fourth set of commingled fibers further comprise fourth fugitive fibers, wherein the fourth fugitive fibers are pyrolyzed from the second fabric layer, wherein a percentage of the second carbon fibers in the second set of commingled fibers exceeds a percentage of the second fugitive fibers in the second set of commingled fibers and wherein a percentage of the fourth carbon fibers in the fourth set of commingled fibers exceeds a percentage of the fourth fugitive fibers in the fourth set of commingled fibers.

16. The manufacturing method of claim 11, wherein the second set of commingled fibers further comprise second fusible fibers and second fugitive fibers, wherein the second fugitive fibers are pyrolyzed from the fabric layer, wherein the fourth set of commingled fibers further comprise fourth fusible fibers and fourth fugitive fibers, and wherein the fourth fugitive fibers are pyrolyzed from the second fabric layer, wherein a percentage of the second carbon fibers in the second set of commingled fibers exceeds a percentage of the second fugitive fibers in the second set of commingled fibers and wherein a percentage of the fourth carbon fibers in the fourth set of commingled fibers exceeds a percentage of the fourth fugitive fibers in the fourth set of commingled fibers.

17. The manufacturing method of claim 11, wherein, responsive to the first carbon fibers being commingled with the first fugitive fibers, a percentage of the first carbon fibers in the first set of commingled fibers exceeds a percentage of the first fugitive fibers in the first set of commingled fibers and wherein, responsive to the third carbon fibers being commingled with the third fugitive fibers, a percentage of the third carbon fibers in the third set of commingled fibers exceeds a percentage of the third fugitive fibers in the third set of commingled fibers.

18. The manufacturing method of claim 11, wherein, responsive to the first fusible fibers being commingled with the first fugitive fibers, a percentage of the first fusible fibers in the first set of commingled fibers exceeds a percentage of the first fugitive fibers in the first set of commingled fibers and wherein, responsive to the third fusible fibers being commingled with the third fugitive fibers, a percentage of the third fusible fibers in the third set of commingled fibers exceeds a percentage of the third fugitive fibers in the third set of commingled fibers.

19. The manufacturing method of claim 11, wherein, responsive to the first carbon fibers and the first fusible fibers being commingled with the first fugitive fibers, a percentage of the first carbon fibers in the first set of commingled fibers exceeds a percentage of the first fugitive fibers in the first set of commingled fibers and wherein, responsive to the third carbon fibers and the third fusible fibers being commingled with the third fugitive fibers, a percentage of the third carbon fibers in the third set of commingled fibers exceeds a percentage of the third fugitive fibers in the third set of commingled fibers.

20. A compositionally gradient preform comprising:
  a gradient comprising fusible fibers and fugitive fibers, wherein the compositionally gradient preform has a plurality of fabric layers, wherein a percentage of the fusible fibers sequentially decreases from one fabric layer in the plurality of fabric layers to a next fabric layer in the plurality of fabric layers in a direction starting from a center fabric layer in the plurality of fabric layers to surface layers in the plurality of fabric layers, wherein a percentage of the fugitive fibers sequentially increases from the one fabric layer in the plurality of fabric layers to the next fabric layer in the plurality of fabric layers in a direction starting from the central fabric layer in the plurality of fabric layers to the surface layers in the plurality of fabric layers, wherein the first fugitive fibers and the third fugitive fibers are comprised of a polymer with a combined char yield of 5% or less by weight, and a residual mass of less than 1% by weight, and wherein the first fusible fibers and the third fusible fibers are comprised of a polymer with a combined char yield of 25% or greater by weight and a residual mass of less than 1% by weight.

* * * * *